United States Patent [19]

O'Halloran et al.

[11] Patent Number: 5,992,161
[45] Date of Patent: Nov. 30, 1999

[54] MAKE-UP HANDLER WITH DIRECT EXPANSION DEHUMIDIFICATION

[75] Inventors: Michael D. O'Halloran; Wilmar A. Kohne, both of Portland, Oreg.; David R. Gurock, York, Pa.

[73] Assignee: CH2MHill Industrial Design Corporation, Portland, Oreg.

[21] Appl. No.: 09/105,897

[22] Filed: Jun. 26, 1998

Related U.S. Application Data

[63] Continuation of application No. 08/682,927, Jul. 16, 1996.
[51] Int. Cl.$^6$ .................................................. F25D 17/06
[52] U.S. Cl. .............................. 62/90; 62/173; 62/176.5
[58] Field of Search ............................ 62/90, 173, 176.5

[56] References Cited

U.S. PATENT DOCUMENTS

| | | | |
|---|---|---|---|
| 3,012,411 | 12/1961 | Kjellman | 62/90 X |
| 5,172,565 | 12/1992 | Wruck et al. | 236/49.3 X |
| 5,400,607 | 3/1995 | Cayce | 62/90 |
| 5,493,871 | 2/1996 | Eiermann | 62/90 X |

Primary Examiner—Henry Bennett
Assistant Examiner—Marc Norman
Attorney, Agent, or Firm—Law Offices of Charles E. Gotlieb

[57] ABSTRACT

A make-up air handler controls temperature, humidity and/or cleanliness of air. The make-up air handler includes a direct expansion chiller system. The direct expansion chiller may be integral to the make-up air handler or remote. A clean room facility uses the make-up air handler to supply air to a clean room. The make-up air handler includes a primary cooling coil and a direct expansion chiller system, and may include a humidifier and a filter. The direct expansion chiller system includes an air stream cooling coil and an air stream heating coil. The heating and cooling coils use a refrigeration fluid which is compressed and circulated by a compressor. Humidity is controlled by removing moisture which is condensed from the air stream by a primary cooling coil and the air stream cooling coil of the direct expansion chiller system. The energy removed by the air stream cooling coil is reintroduced to the air stream by the air stream heating coil. The process of removing moisture directly removes contamination. The process of lowering humidity causes contaminant particles to form which can be removed by a filter.

20 Claims, 4 Drawing Sheets

MAKE-UP HANDLER WITH DIRECT EXPANSION DEHUMIDIFICATION

RELATED APPLICATION

This application is a continuation of copending application Ser. No. 08/682,927, titled "Make-up Air Handler with Direct Expansion Dehumidification" filed Jul. 16, 1996 by Michael O'Halloran, Wilmar Kohne and David Gurock, having the same assignees as this application, and is hereby incorporated by reference in its entirety.

FIELD OF THE INVENTION

The present invention relates to make-up air systems that control temperature and humidity and/or cleanliness of make-up air, and more particularly to clean room make-up air systems.

BACKGROUND OF THE INVENTION

Many facilities, such as semiconductor clean rooms, typically require that significant quantities of outside make-up air be introduced into the facility to compensate for process air usage and leakage or to comply with code requirements. Such facilities often require that the relative humidity of the air within a building be controlled to a preselected target setting. A make-up air handler renders outside air that is necessary for use inside the plant to the conditions required to maintain control inside the plant. This typically requires temperature, humidity, and contamination control. Depending on outside air climatic conditions, this typically includes dehumidification by cooling of make-up air to extract undesirable moisture and may include air filtration when cleanliness of the inside environment is required: one conventional system for humidity control is described below in conjunction with FIG. 1.

SUMMARY OF THE INVENTION

In the present invention, a make-up air handler controls the temperature and humidity in the make-up air stream with a direct expansion chiller integrated with the operation of the make-up air handler. The direct expansion chiller system includes: a compressor unit, an air stream cooling coil, an expansion valve, and an air stream heating coil. The air stream cooling coil removes heat from the air stream and heats the working fluid of the direct expansion chiller system, thus replacing the function of the secondary cooling coil in a conventional system. The air stream heating coil rejects heat from the direct expansion chiller system back into the air stream, thus replacing part of the function of the heating coil. If air cleaning functions are desired, the system is operated so that moisture is condensed at the air stream cooling coil to remove condensable and water soluble contaminants from the air stream. This moisture may be added by a conventional humidifier. In addition, the direct expansion chiller system may be operated so that the relative humidity of the air stream leaving the air stream heating coil of the direct expansion chiller system is sufficiently low to cause contaminants to form particles for removal by a filter.

A clean room facility includes such a direct expansion air handler for controlling the temperature and humidity in make-up air and, optionally, the additional function of removing contamination from the make-up air stream. The clean room facility also includes a clean room coupled to the direct expansion unit for receiving the make-up air. In such a facility, the make-up air handler could be using 100% outside air or some mixture of outside and recirculated air.

The air handler of the present invention provides chilling more efficiently and thus reduces the size and cost of the chiller plant and associated piping and electrical systems for a given facility size. The air handler provides more precise control of temperature and humidity. The air handler of the present invention may include the direct expansion system built within the air handler to thereby eliminate the need for a secondary chiller and associated piping and controls at a remote plant.

Dehumidification is often advantageous during plant construction. Because the direct expansion chiller may be part of the air handler, the direct expansion chiller can more economically provide dehumidification earlier in the construction cycle of the facility. The direct expansion chiller system removes moisture from the air stream, which may contain contaminates, and also can render the appropriate relative humidity to the air stream to remove contaminates by filtration.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF A PREFERRED EMBODIMENT

Figure 1:
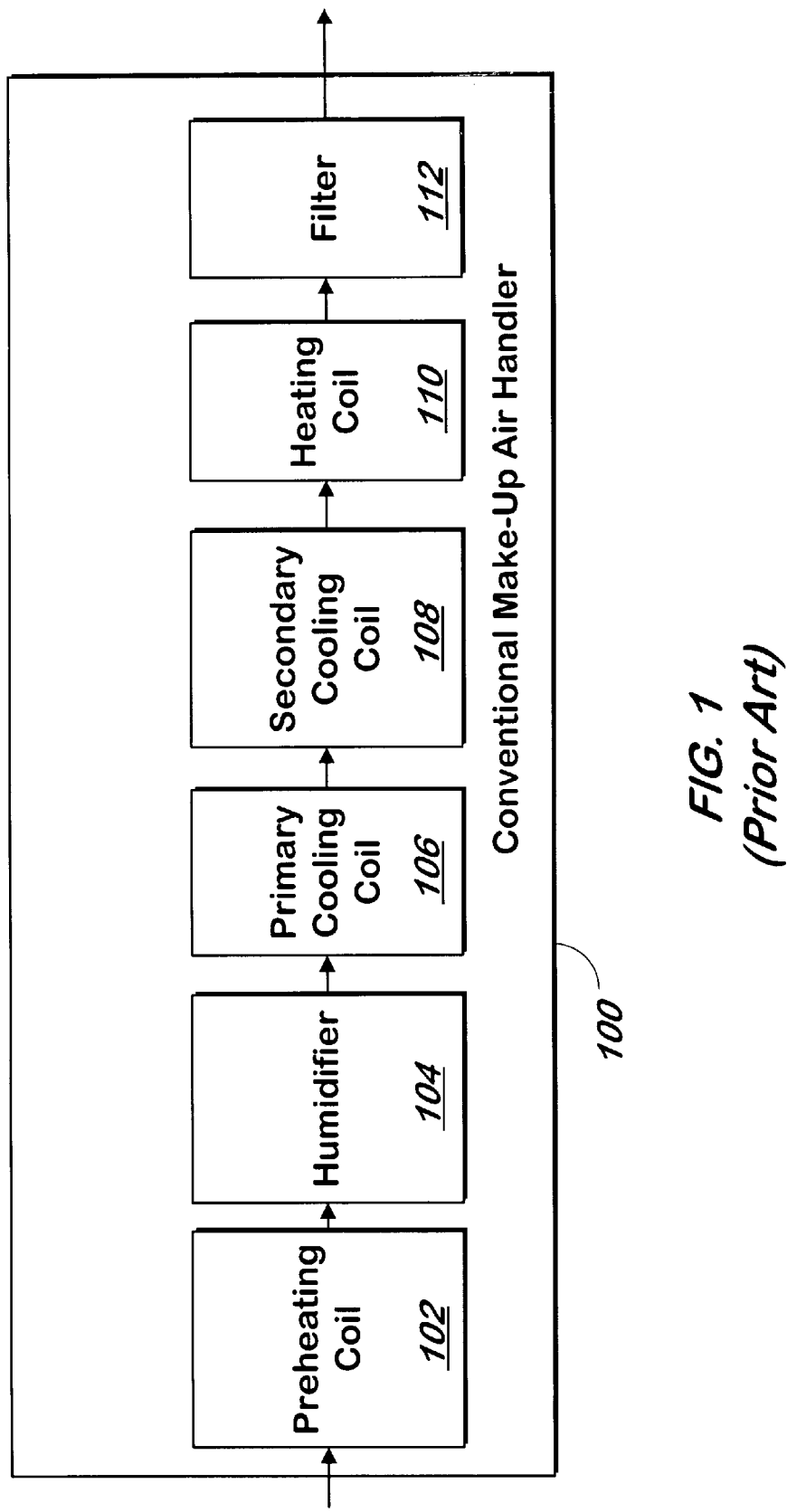
FIG. 1 is a block diagram illustrating a conventional make-up air handler.

Referring to FIG. 1, there is shown a block diagram illustrating a conventional make-up air handler 100, which comprises a preheating coil 102, a humidifier 104, a primary cooling coil 106, a secondary cooling coil 108, a heating coil 110 and a filter 112. The preheating coil 102 heats the incoming air when the air is colder than a predetermined temperature. The preheating coil 102 is a conventional preheat coil. The humidifier 104 adds moisture to the air when the air is dryer than a predetermined wet bulb temperature. The humidifier 104 is a conventional humidifier. The primary cooling coil 106 cools incoming warm, moist air to a preset temperature. The incoming air is typically in a wide temperature range because of seasonal variations. This cooling is performed when the ambient air temperature is warmer than the preset temperature. The primary cooling coil 106 includes a series of coils using chilled water from a remote utility plant (not shown).

The secondary cooling coil 108 further cools the air to a target dew point temperature that is associated with a desired humidity. The secondary cooling coil 108 has typically a lower temperature source of chilled water or a glycol mixture. A glycol mixture allows the dew point temperature to be close to freezing. The lower temperature secondary cooling coil 108 typically has chillers at a remote site (not shown) with the associated piping to the make-up air handler 100. The primary cooling coil 106 and the secondary cooling coil 108 are conventional coils that have associated chillers (not shown) which reject heat to the external environment.

The heating coil 110 reheats the air to the desired air temperature for introduction to a facility. The heating coil 110 typically receives the heat from a remote heating facility (not shown). The conventional make-up air handler 100 removes contaminants in the air by conventional water washing (not shown) or filtration by the filter 112.

Figure 2:
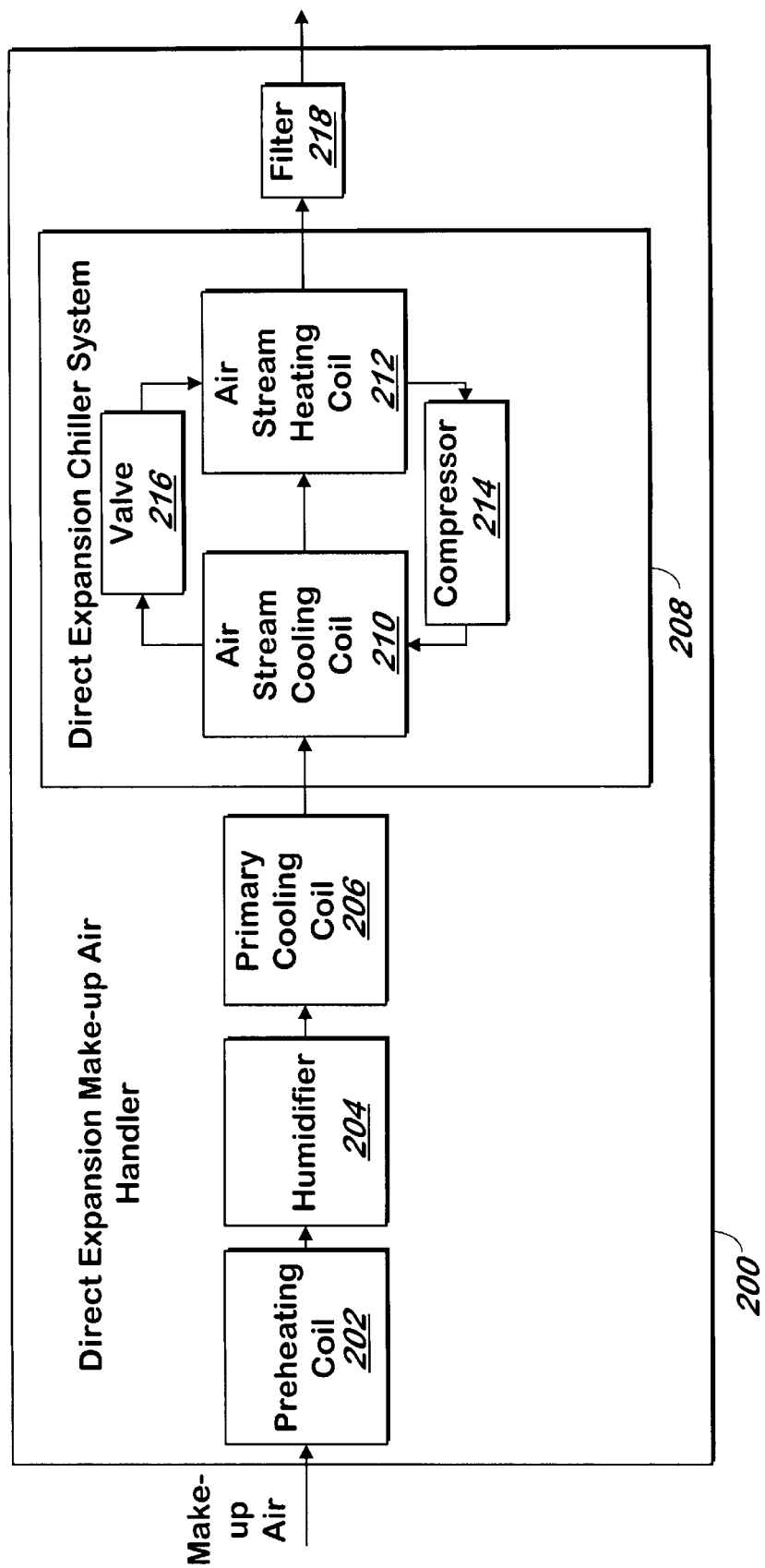
FIG. 2 is a block diagram illustrating a direct expansion make-up air handler in accordance with the present invention.
Figure 3:
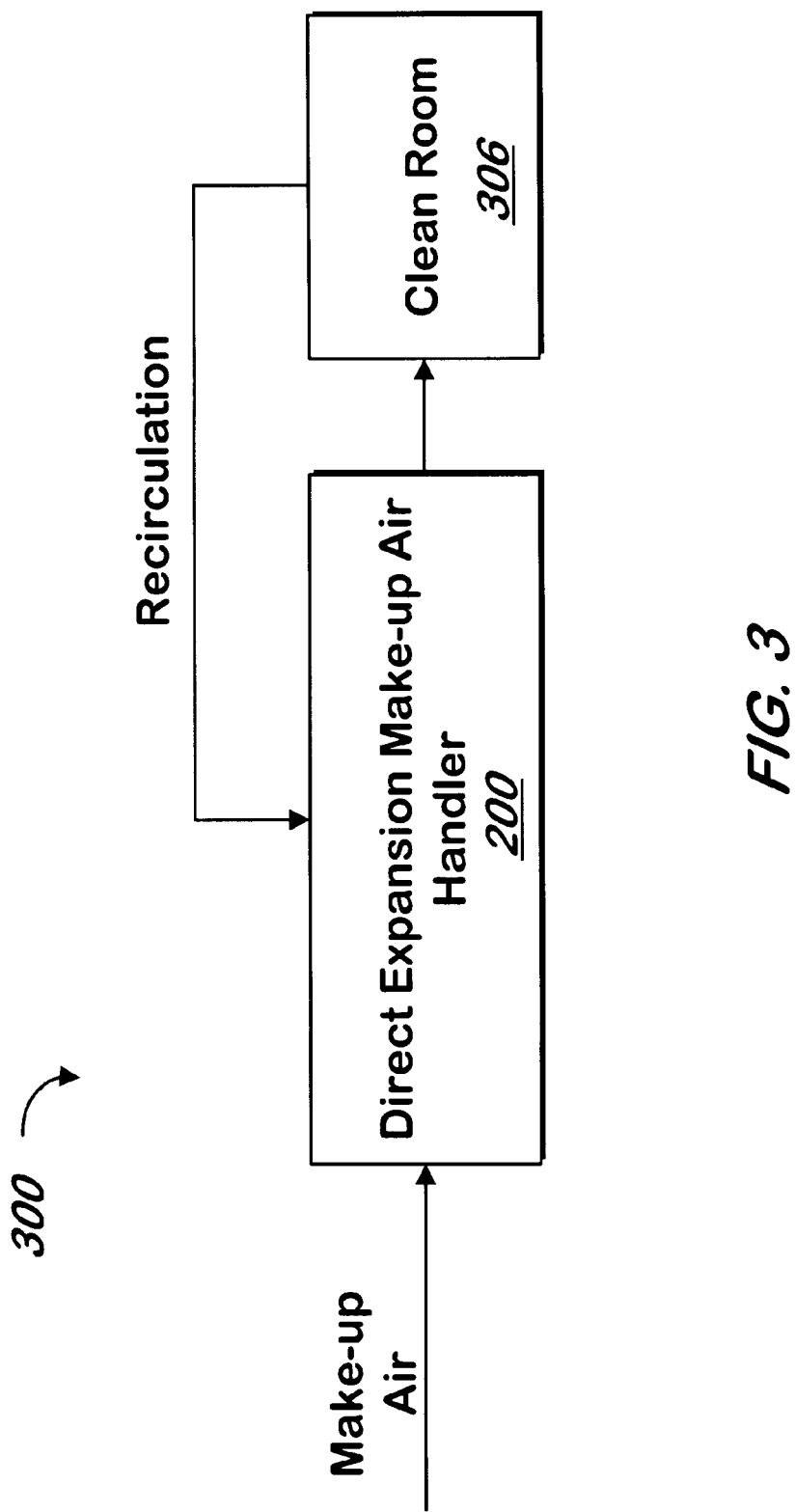
FIG. 3 is a block diagram illustrating a clean room facility using the direct expansion make-up air handler of FIG. 2.

Referring to FIG. 2, there is shown a block diagram illustrating a direct expansion make-up air handler 200 in accordance with the present invention. Referring to FIG. 3, there is shown a block diagram illustrating a clean room facility 300 using the direct expansion make-up air handler 200. The clean room facility 300 includes a direct expansion make-up air handler 200 and a clean room 306. The direct expansion make-up air handler 200 provides make-up air to the clean room 306 and controls the temperature and the humidity of the make-up air.

The direct expansion make-up air handler 200 includes a preheating coil 202, a humidifier 204, a primary cooling coil 206, a direct expansion chiller system 208, and a filter 218. The preheating coil 202 heats incoming make-up air when the make-up air is colder than a predetermined temperature. The preheating coil 202 may be, for example, a conventional coil. The humidifier 204 adds moisture to the make-up air when the air is dryer than a predetermined wet bulb temperature. The humidifier 204 may be, for example, a conventional humidifier. The primary cooling coil 206 cools the incoming air to a preset temperature. The primary cooling coil 206 may be, for example, a conventional coil whose operation is similar to the operation of the primary cooling coil 106. The primary cooling coil 206 may include, for example, a series of coils using chilled water from a remote chiller plant (not shown).

The direct expansion chiller system 208 includes an air stream cooling coil 210, an air stream heating coil 212, a compressor 214, and an expansion valve 216. The direct expansion chiller system 208 performs dehumidification of the make-up air by lowering the air temperature to a target dew point temperature that is associated with a desired humidity. The compressor 214 compresses and circulates a refrigerant working fluid between the coils 210 and 212. The air stream cooling coil 210 lowers the air temperature to a target temperature which causes condensation and dehumidification of the air stream. During the process, energy is transferred to the refrigerant fluid. The heating coil 212 reheats the air stream to a second target temperature by rejecting heat from the refrigerant fluid to the make-up air, thereby cooling the refrigerant. The expansion valve 216 controls the flow of the refrigerant fluid between the coils 210 and 212. Air may be recirculated from the clean room 306 to the direct expansion make-up air handler 200.

The primary cooling coil 206 and the air stream cooling coil 210 condense water from the make-up air to remove contamination from the make-up air. Additionally, the direct expansion chiller system 208 may be operated such that the relative humidity of the air stream is lowered to a relative humidity at which contamination forms particles that are removable by the filter 218.

Figure 4:
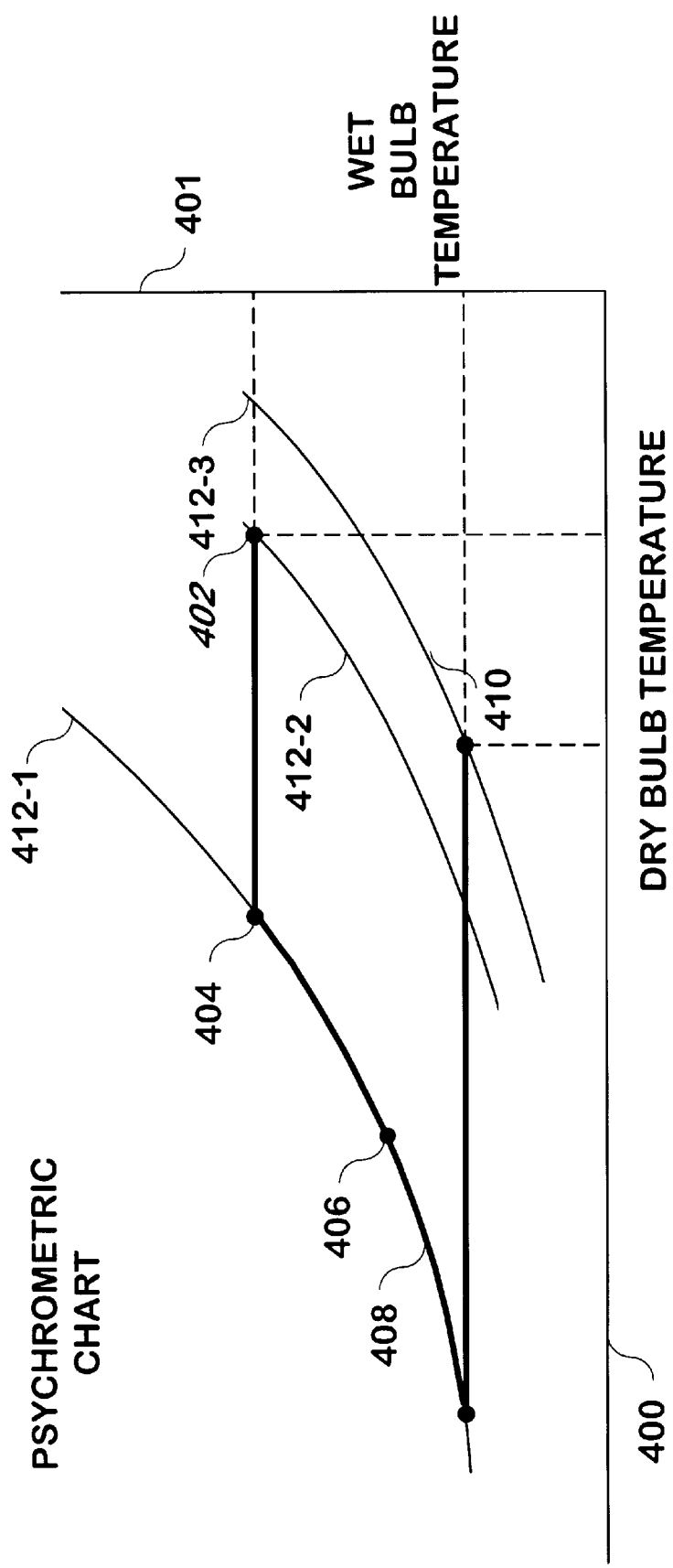
FIG. 4 is a psychrometric diagram illustrating an exemplary thermal cycle of the direct expansion make-up air handler of FIG. 2.

Referring to FIG. 4, there is shown a psychrometric diagram illustrating an exemplary thermal cycle of the direct expansion make-up air handler 200. The horizontal axis 400 represents dry bulb temperature. The vertical axis 401 represents dew point temperature. Points 402, 404, 406, 408, and 410 represent various thermodynamic states of the make-up air during the thermal cycle of the direct expansion make-up air handler 200. The point 402 is the entry condition of make-up air to the direct expansion make-up air handler 200. The point 410 is the target condition of the discharge make-up air from the direct expansion make-up air handler 200. Lines 412-1, 412-2 and 412-3 show lines of constant relative humidity. The line 412-1 represents 100% relative humidity. The line 412-2 is the relative humidity of the inlet air to the direct expansion make-up air handler. The line 412-3 is the relative humidity target at the discharge of the direct expansion make-up air handler 200.

The temperature and humidity of the air entering the primary cooling coil 206 is at the point 402. The primary cooling coil 206 chills the make-up air without removing moisture until the make-up air reaches the temperature and humidity of the point 404. The primary cooling coil 206 then continues to cool the make-up air but also removes moisture from the make-up air. During this stage, the temperature follows the line 412-1 of constant 100% relative humidity until reaching the point 406. Air moves to the air stream cooling coil 210 of the direct expansion unit 208 which cools the make-up air and removes moisture from the air along the line 412-1 of constant 100% relative humidity until reaching the point 408, which has the same wet bulb temperature as the target wet bulb temperature 410. The air stream heating coil 212 then heats the make-up air until the air reaches the target point 410. The direct expansion air handler 200 provides make-up air to the clean room 306 at the desired temperature and humidity by using the rejected heat from the cooling cycle to reheat the air.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A direct expansion air handler for controlling a temperature of, and moisture in, air supplied at an outlet for use in a facility, the direct expansion air handler comprising:

the outlet;

a direct expansion chiller system for removal of moisture and reheat of the air to a first temperature and humidity, the direct expansion chiller system including a first cooler for cooling the air to a second temperature and for reducing the moisture in the air to a target moisture level; and a first heater coupled to, and downstream from, the first cooler for heating the air to a third temperature; and wherein:

a refrigerant is circulated between the first cooler and the first heater; and the direct expansion air handler adjusts a relative moisture level in the air to a level not higher than a level at which contamination in the air forms particles that are removable by a filter located downstream from the first cooler.

2. The direct expansion air handler of claim 1, additionally comprising a second cooler for cooling the air to a first preset temperature.

3. The direct expansion air handler of claim 2 wherein at least one selected from the first cooler and the second cooler condenses water from the air, thereby removing contamination from the air.

4. The direct expansion air handler of claim 2 wherein at least one selected from the second cooler, and the first cooler adjust a relative moisture level in the air to a level not higher than a level at which contamination in the air forms particles that are removable by the filter.

5. The direct expansion air handler of claim 1, wherein the outlet is coupled to a clean room and the direct expansion air handler controls a humidity of make-up air supplied to the clean room.

6. The direct expansion air handler of claim 5:
   wherein the second cooler and the direct expansion chiller system condense water from the clean room air to remove contamination from air supplied to the clean room.

7. The direct expansion air handler of claim 5:
   wherein at least one selected from the second cooler and the direct expansion chiller system modifies the humidity of the air supplied to the clean room such that the filter can remove contamination from the air supplied to the clean room.

8. The direct expansion air handler of claim 1 additionally comprising a humidifier for adding moisture to the air.

9. The direct expansion air handler of claim 1 additionally comprising a second heater for adding heat to the air.

10. A method of removing humidity from air supplied at an outlet for use in a facility, the method comprising:
    receiving the air at a first temperature and a first humidity level;
    transferring heat from a first surface to a second surface;
    passing the air near at least a portion of the first surface having a temperature lower than the first temperature, thereby cooling said air to a second temperature below the first temperature and not higher than the dew point of the air, and thereby reducing the level of humidity of the air to a second humidity level lower than the first humidity level;
    passing the air near at least a portion of the second surface having a temperature higher than the second temperature, thereby warming the air to a third temperature higher than the second temperature; and
    supplying the air substantially at the third temperature to the outlet; and
    wherein the humidity of the air is reduced to a level not higher than a level at which contamination in the air forms particles that are removable by a filter.

11. The method of claim 10, comprising the additional steps of:
    receiving the air at a fourth temperature and a third humidity level;
    passing the air near a third surface having a temperature lower than the fourth temperature, thereby cooling said air to a fifth temperature below the fourth temperature and not higher than a dew point of the air, and thereby reducing the level of humidity of the air to a fourth humidity level lower than the third humidity level; and
    wherein the air passed near the third surface has a temperature substantially the same as the fourth temperature before it is passed near the third surface.

12. The method of claim 11, wherein the air is passed near the first surface after the air is passed near the third surface.

13. The method of claim 11, wherein the air is passed near the second surface after the air is passed near the first surface.

14. The method of claim 11 additionally comprising the steps of:
    receiving the air at a fourth temperature lower than the first temperature;
    warming the air received to the fifth temperature; and
    providing the air warmed.

15. The method of claim 14 wherein the fourth temperature is lower than the temperature of the first surface.

16. The method of claim 10 comprising the additional step of raising the temperature of the air.

17. The method of claim 10 comprising the additional step of adding moisture to the air.

18. The method of claim 10 additionally comprising the step of passing the air near a filter after the passing the air near at least a portion of second surface step.

19. The method of claim 18 additionally comprising the step of providing the air to a cleanroom.

20. A direct expansion air handler for controlling a temperature of, and moisture in, air supplied at an outlet for use in a facility, the direct expansion air handler comprising:
    the outlet;
    a direct expansion chiller system for removal of moisture and reheat of the air to a first temperature and humidity, the direct expansion chiller system including
      a first cooler for cooling the air to a second temperature and for reducing the moisture in the air to a target moisture level; and
      a first heater coupled to, and downstream from, the first cooler for heating the air to a third temperature; and
    wherein:
    a refrigerant is circulated between the first cooler and the first heater; and
    the direct expansion air handler condenses water from the air, thereby removing contamination from the air.

* * * * *